United States Patent
Capoldi et al.

(10) Patent No.: US 11,486,444 B2
(45) Date of Patent: Nov. 1, 2022

(54) BEARING WITH AT LEAST ONE SEALING ELEMENT AND AT LEAST ONE ADJUSTING SHIM FOR AXIALLY DISPLACING SAID SEALING ELEMENT

(71) Applicant: Aktiebolaget SKF, Gothenburg (SE)

(72) Inventors: Bruno Capoldi, Charentenay (FR); Juliette Delaby, Charentenay (FR); Herve Dondaine, Avallon (FR)

(73) Assignee: Aktiebolaget SKF, Gothenburg (SE)

( * ) Notice: Subject to any disclaimer, the term of this patent is extended or adjusted under 35 U.S.C. 154(b) by 71 days.

(21) Appl. No.: 17/071,461

(22) Filed: Oct. 15, 2020

(65) Prior Publication Data

US 2021/0140482 A1    May 13, 2021

(51) Int. Cl.
*F16C 33/78*    (2006.01)
*F16C 33/58*    (2006.01)
*F16C 33/76*    (2006.01)
*F16C 19/38*    (2006.01)

(52) U.S. Cl.
CPC ........ *F16C 33/7896* (2013.01); *F16C 33/586* (2013.01); *F16C 33/76* (2013.01); *F16C 33/7886* (2013.01); *F16C 19/381* (2013.01); *F16C 33/783* (2013.01); *F16C 2300/14* (2013.01); *F16C 2300/42* (2013.01)

(58) Field of Classification Search
CPC ...... F16C 33/586; F16C 33/76; F16C 33/783; F16C 33/7886; F16C 33/7896; F16C 19/381; F16C 2300/14; F16C 2300/42
See application file for complete search history.

(56) References Cited

U.S. PATENT DOCUMENTS

| | | | |
|---|---|---|---|
| 9,494,197 B2 | 11/2016 | Capoldi | |
| 2014/0029882 A1* | 1/2014 | Palmer | F16C 33/7896 384/473 |
| 2014/0191508 A1* | 7/2014 | Schroppel | F03B 13/10 290/53 |
| 2016/0341316 A1* | 11/2016 | Baumann | F03B 11/006 |
| 2019/0257294 A1* | 8/2019 | Abreu | F03D 1/0691 |

FOREIGN PATENT DOCUMENTS

| | | |
|---|---|---|
| DE | 102011011165 A1 | 8/2012 |
| DE | 102018213356 A1 | 10/2019 |
| DE | 102018213357 A1 | 10/2019 |

* cited by examiner

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A bearing providing a first ring assembly and a second ring assembly, the first ring assembly including at least a first ring and an outer cap reversibly fixed to first ring. The bearing further providing at least one sealing element mounted radially into a cylindrical surface of the first ring assembly and provided with a sealing lip in sliding frictional contact with the second ring assembly. The bearing including at least one adjusting shim mounted radially between the first and second ring assemblies, the adjusting shim being axially located between the outer cap of the first ring assembly and the sealing element; or between the first ring of the first ring assembly and the sealing element.

15 Claims, 6 Drawing Sheets

BEARING WITH AT LEAST ONE SEALING ELEMENT AND AT LEAST ONE ADJUSTING SHIM FOR AXIALLY DISPLACING SAID SEALING ELEMENT

CROSS-REFERENCE TO RELATED APPLICATIONS

This application claims priority to German Patent Application no. 102019217411.6, filed Nov. 12, 2019, the contents of which is fully incorporated herein by reference.

TECHNICAL FIELD OF THE INVENTION

The present invention relates to the field of rolling bearings. More particularly, the invention concerns the field of sealings mounted between two rings of a rolling bearings.

BACKGROUND OF THE INVENTION

The invention relates to large diameter rolling bearings, notably slewing bearings used in marine applications, for example in a tidal or marine turbine power station.

The invention is not limited to such application, and can be used in other application, such as large diameter rolling bearings used in tunnel boring machines, such as tunnellers.

Large diameter rolling bearings generally comprise an inner ring, an outer ring and sealing elements disposed between the rings in order to define a closed annular space within which at least one row of rolling elements, such as, for example, balls or rollers, is arranged between the rings.

Slewing bearings are used in aggressive environments, in particular in marine applications. Sealing elements prevent external elements, such as dust, abrasive particles, water and marine species, for example plankton and algae, from getting inside the bearing and damaging its components. Those external elements may also alter the sealing element itself, leading to a reduction in the sealing element service life.

Typically, sealing elements are fixed to one of the rings and comprise a sealing lip in sliding contact with the other ring. Generally, a plurality of adjacent sealing elements is provided on the front side of the bearing which is directly in contact with saltwater. The lips of adjacent sealing elements may have different orientation directions.

However, the sealing of such bearings may be insufficient, notably for use in a submersible machine or in a tunnel boring machine.

Indeed, the first sealing element is the first seal to be damaged. Adding sealing elements increases the cost of the rolling bearing, as well as its weight.

Furthermore, after several years of use, the sealing elements running surface wears. The ring including such running surface must then be changed, which increases the maintenance costs of the rolling bearing. Indeed, the rings of rolling bearings used in slewing bearings or bearings for tunnellers are quite expensive, due to the material used for those rings that has to be corrosion resistant as well as hard to limit wear.

There is a need to provide an improved sealing of rolling bearings, while increasing the service life of the rings, notably the sealing running surfaces, of the rolling bearings.

SUMMARY OF THE INVENTION

The aim of the present invention is consequently to provide a rolling bearing having effective sealing elements capable of preventing entry of external elements and of increased service life, particularly in aggressive environment, as well as being easy to implement.

The invention provides a bearing comprising:
a first ring assembly, and
a second ring assembly, the first ring assembly comprising at least a first ring and an outer cap reversibly fixed to the first ring, for example on a frontal surface of the first ring.

The bearing further comprises at least one sealing element mounted radially into contact with a cylindrical surface of the first ring assembly and provided with a sealing lip in sliding frictional contact with the second ring assembly.

The bearing further comprises at least one adjusting shim mounted radially between the first and second ring assemblies, for example on the cylindrical surface of the first ring assembly.

In one embodiment, the adjusting shim is located axially between the outer cap, for example a first shoulder, of the first ring assembly, and the sealing element.

In another embodiment, the adjusting shim is located axially between the first ring, for example a second shoulder of the first ring assembly, axially opposite to the first shoulder, and the sealing element.

The adjusting shim is thus configured to adopt at least two axial positions inside the bearing.

The adjusting shim allows the sealing elements to have different running surfaces, thereby significantly increasing the service life of the sealing running surface.

Indeed, by displacing the adjusting shim along the running surface, the sealing elements are also axially displaced along the sealing running surface provided on the second ring, thereby increasing the lifetime of the second ring.

For example, the sealing element comprises an annular heel mounted on a cylindrical surface of the first ring assembly.

Advantageously, the adjusting shim comprises an annular ring and an annular axial collar axially extending from the annular ring, the annular axial collar being configured to radially block the sealing element.

The annular axial collar allows to radially retain the sealing elements and to maintain the static sealing function.

For example, the adjusting shim is circumferentially segmented in at least two segments.

For example, the number of shim segments may be more than two, for example six. The segmented shim is easier to be mounted and thus cheaper.

The adjusting shim is preferably made in plastic material, such as polymer, for example peek or any sea water resistant material.

In an embodiment, the bearing further comprises at least two sealing elements and at least one guiding ring axially arranged between the two sealing elements, the guiding ring comprising a flange radially projecting towards the second ring assembly inclined in the same direction as the sealing lip of one of the sealing elements. The adjusting shim may thus be clamped with the sealing elements by the guiding ring, which may for example assembled to the bearing by bolts.

In an embodiment, the bearing may comprise two guiding rings, or more than two guiding rings.

For example, the guiding ring further comprises an annular axial collar configured to radially block the annular heel of the other sealing element.

In an embodiment, the bearing comprises at least two adjusting shims mounted radially between the first and second ring assemblies, for example on the cylindrical surface of the first ring assembly.

In an embodiment, the first adjusting shim is axially located between the outer cap, for example a first shoulder of the first ring assembly, and the second adjusting shim and the second adjusting shim is axially located between the first adjusting shim and the uppermost sealing element.

In another embodiment, the first adjusting shim is axially located between the outer cap, for example a first shoulder of the first ring assembly and the uppermost sealing element, and the second adjusting shim is axially located between the first ring of the first ring assembly and the lowermost sealing element.

In another embodiment, the first adjusting shim is axially located between the lowermost sealing element and the second adjusting shim and the second adjusting shim is axially located between the first ring, for example a second shoulder of the first ring assembly, axially opposite to the first shoulder, and the first adjusting shim.

For example, in an embodiment, the annular axial collar of the second adjusting shim blocks radially the uppermost sealing element, for example its annular heel, while the annular axial collar of the first adjusting shim blocks radially the annular ring of the second adjusting shim.

For example, in an embodiment, the annular axial collar of the first adjusting shim blocks radially the lowermost sealing element, for example its annular heel, while the annular axial collar of the second adjusting shim blocks radially the lowermost sealing element, for example its annular heel.

For example, in an embodiment, the annular axial collar of the first adjusting shim blocks radially the lowermost sealing element, for example its annular ring heel, while the annular axial collar of the second adjusting shim blocks radially the annular ring of the first adjusting shim.

By displacing the adjusting shims along the sealing running surface of the second ring assembly, the sealing elements are also axially displaced along the sealing running surface, thereby increasing the lifetime of the second ring assembly.

The adjusting shims may thus be clamped with the sealing elements by the guiding rings.

When positioning the adjusting shims, the first and/or the second adjusting shim is reversed in order that the annular axial collar clamps radially the associated sealing elements and maintains the static sealing function.

Each adjusting shim may be one single annular ring of 360° or may comprise a plurality of ring segments each having an annular ring part and an axial collar. For example, each adjusting shim may be segmented in six segments. Alternatively, each adjusting shim may be segmented in two or more segments. For example, one adjusting shim may be an annular ring and the other adjusting shim may be segmented. As an alternative, the number of segments of each adjusting shim may be different.

As an alternative, the number of adjusting shim may be different. For example, the bearing may comprise one adjusting shim having at least two different axial positions, or a number of adjusting shims higher than three.

For example, the adjusting shim is mounted in the cylindrical surface of the outer cap or in the cylindrical surface of the first ring.

For example, the sealing elements are mounted at least in the cylindrical surface of the outer cap or in the cylindrical surface of the first ring.

For example, the bearing is a rolling bearing comprising at least one row of rolling elements arranged between the ring assemblies. As an alternative, the bearing may be a plain bearing.

In an embodiment, the first ring is the outer ring of the bearing.

In an embodiment, the bearing is a slewing bearing.

In another embodiment, the bearing is a roller bearing.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
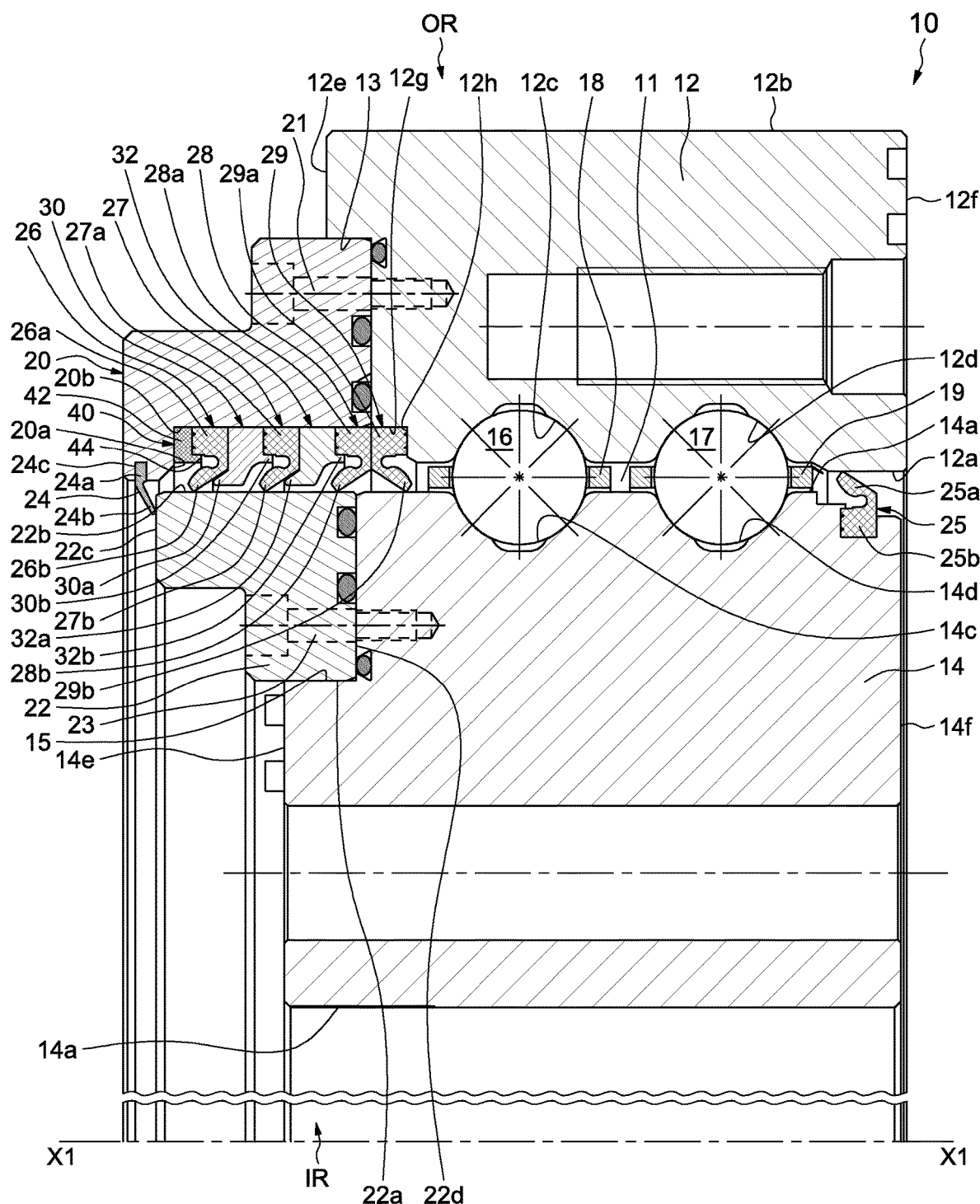
FIG. 1 is a partial view in axial section of a bearing according to a first embodiment of the invention, having an adjustable shim in a first position.

The expressions "outer" and "inner" refer to the rotation axis X1-X1 of the bearing, the inner parts being closer to the rotation axis than the outer parts.

Referring first to FIGS. 1 to 4, which illustrate an embodiment of a bearing 10, for example a slewing bearing of large diameter intended to be used in particular in marine applications, such as, for example, a tidal power station (not shown).

The slewing bearing 10 comprises an outer ring 12 as a first ring, a rotating inner ring 14 as a second ring, two rows of rolling elements 16, 17, such as for example balls, arranged between the inner and outer rings 12, 14, and two cages 18, 19 each configured to maintain the circumferential spacing of the rolling elements of each row 16, 17. Such slewing bearing 10 forms an axial thrust configured to transmit axial and radial loads, as well as torques.

As an alternative, it is possible to conceive a single row of rolling elements between the inner and outer rings to form an axial thrust configured to transmit axial loads. It is also possible to have other rolling elements than balls, such as for example, rollers or any rolling elements.

The outer ring 12 and the inner ring 14 are in the form of concentric rings rotatable around the rotation axis X1-X1 of the bearing 10, the outer ring 12 surrounding radially the inner ring 14.

As illustrated, the outer ring 12 is of solid type and is radially delimited by an inner cylindrical surface 12a and an outer cylindrical surface 12b. The outer ring 12 has, on its inner cylindrical surface 12a, two toroidal groove 12c, 12d the radius of curvature of which is slightly greater than the radius of the rolling elements 16, 17 and forms a bearing race for the rolling elements 16, 17.

The outer ring 12 may be manufactured by machining or by pressing a steel blank, which is then ground and optionally lapped at the bearing races 12c, 12d in order to give the ring 12 its geometrical characteristics and its final surface finish.

The outer ring 12 is formed in one piece but may comprise a plurality of ring segments assembled.

The outer ring 12 also comprises two radial frontal surfaces 12e, 12f which axially delimits the inner cylindrical surface 12a and the outer cylindrical surface 12b.

The outer cylindrical surface 12b and the first frontal surface 12e are directly exposed to the marine environment and may be covered with corrosion protective layer (not shown), whereas the inner cylindrical surface 12a and the second frontal surface 12f are arranged in a chassis (not shown) and are therefore less subjected to corrosion.

The first frontal surface 12e of the outer ring 12 comprises a circumferential groove 12g radially opening towards the inner ring 14 and axially delimited between a radial shoulder 12h of the outer ring and a first shoulder 20a of an outer cap 20.

The outer cap 20 is reversibly fixed to the outer ring 12 by fixing means, such as screws 21 screwed in threaded holes (not referenced) provided in the outer cap 20 and the outer ring 12. The outer cap 20 is mounted in a circumferential recess 13 provided on the first frontal surface 12e of the outer ring 12.

As illustrated, the outer cap 20 is annular. Alternatively, the outer cap may comprise a plurality of circumferentially adjacent outer cap parts.

The outer cap 20 further comprises a circumferential groove 20b coaxial with the circumferential groove 12g of the outer ring 12. The assembly comprising the outer cap 20 and the outer ring 12 may form the outer ring assembly OR of the slewing bearing. The shoulder 20a of the cap is referred to as first shoulder of the outer ring assembly, and the shoulder 12h of the outer ring 12 is referred to as second shoulder of the outer ring assembly, axially opposite to the first shoulder compared to the sealing elements.

As illustrated, the inner ring 14 is of solid type and is radially delimited by an inner cylindrical surface 14a and an outer cylindrical surface 14b. The inner ring 14 has, on its outer cylindrical surface 14b, two toroidal groove 14c, 14d the radius of curvature of which is slightly greater than the radius of the rolling elements 16, 17 and forms a bearing race for the rolling elements 16, 17.

The inner ring 14 may be manufactured by machining or by pressing a steel blank, which is then ground and optionally lapped at the bearing races 14c, 14d in order to give the ring 14 its geometrical characteristics and its final surface finish.

The inner ring 14 is formed in one piece but may comprise a plurality of ring segments assembled.

The inner ring 14 also comprises two radial frontal surfaces 14e, 14f which axially delimits the inner cylindrical surface 14a and the outer cylindrical surface 14b.

The first frontal surface 14f is directly exposed to the marine environment and may be covered with corrosion protective layer (not shown), whereas the second frontal surface 14e is arranged in a chassis (not shown) and are therefore less subjected to corrosion.

The first frontal surface 14e of the inner ring 14 comprises a circumferential groove 15 radially opening towards the outer ring 12 and configured to receive an annular sealing contact member 22.

The annular sealing contact member 22 is fixed to the inner ring 14 by fixing means, such as screws 23 screwed in threaded holes (not referenced) provided in the sealing contact member 22 and the inner ring 14. The assembly comprising the sealing contact member 22 and the inner ring 14 may form the inner ring assembly IR of the slewing bearing.

As illustrated, the annular sealing contact member 22 is annular. Alternatively, the annular sealing contact member 22 may comprise a plurality of circumferentially adjacent annular sealing contact member parts.

The annular sealing contact member 22 is radially delimited by an inner cylindrical surface 22a and an outer cylindrical surface 22b and axially by a first frontal surface 22c and an opposite second frontal surface 22d.

The inner cylindrical surface 22a or bore is coaxial with the outer cylindrical surface 14b of the inner ring 14.

As illustrated, the cap 20 is further provided with a cap sealing member 24 comprising an annular heel 24a mounted in an annular slot 22c provided in the bore of the first shoulder 20a of the cap 20 and a sealing lip 24b projecting radially inwardly towards the inner ring 14. The sealing lip 24b has a free end in sliding frictional contact with a sealing contact surface provided on the first frontal surface 22c of the sealing contact member 22. The sealing lip 24b provides dynamic sealing function with the sealing contact member 22 fixed to the inner ring 14. The contact between the sealing lip 24b and the sealing contact member 22 is axial. The cap sealing member 24 is designed to limit the infiltration of particles and dust towards the rolling elements.

The slewing bearing 10 further comprises a lower seal 25 axially opposite the cap sealing member 24. The lower seal 25 comprises an annular heel 25a mounted in an annular slot provided in the outer surface 14b of the inner ring 14 and a sealing lip 25b projecting radially outwardly towards the outer ring 12. The sealing lip 25b has a free end in sliding frictional contact with a sealing contact surface provided on the inner cylindrical surface or bore 12a of the outer ring 12. The sealing lip 25b provides dynamic sealing function with the outer ring 12. The contact between the sealing lip 25b and the outer ring 12 is radial. Alternatively, the lower seal could be mounted on the inner ring 14.

The cap sealing member 24 and the lower seal 25 define an annular closed space 11 between the inner and outer rings 12, 14 within which are arranged the rows of rolling elements 16, 17. Advantageously, the annular closed space 11 is filled with lubricant.

The slewing bearing 10 further comprises upper sealing elements 26, 27, 28, 29 mounted in the circumferential groove 12g of the outer ring 12 and in the circumferential groove 20b of the outer cap 20.

Alternatively, the slewing bearing may comprise one, two or more than two upper sealing elements. The upper sealing elements 26, 27, 28, 29 may be made of elastomeric material, for example polyurethane. The upper sealing elements 26, 27, 28, 29 are designed to limit the infiltration of liquids from the subsea environment between the inner ring 14 and the outer ring 12.

The upper sealing elements 26, 27, 28, 29 each comprise an annular heel 26a, 27a, 28a, 29a mounted in circumferential groove 12g of the outer ring 12 and in the circumferential groove 20b of the outer cap 20. As illustrated, and as a non-limiting example, one sealing element 29 is mounted in the circumferential groove 12g of the outer ring 12 and three sealing elements 26, 27, 28 are mounted in the circumferential groove 20b of the outer cap 20.

The upper sealing elements 26, 27, 28, 29 further each comprise a sealing lip 26b, 27b, 28b, 29b projecting radially inwardly towards the inner ring 14. The sealing lips 26b, 27b, 28b, 29b are flexible in the radial direction. As illustrated, the sealing lips 26b, 27b, 28b, 29b extend obliquely with respect to a radial plane. As illustrated, the lowermost seal 29 is provided with a sealing lip 29b that is oriented opposite to the orientation of the sealing lip 26b of the upper most sealing element 26.

The sealing lip 29b of the lowermost sealing element 29 is in sliding contact with a sliding contact surface provided on the outer cylindrical surface 14b of the inner ring 14.

The sealing lips 26b, 27b, 28b of the uppermost sealing element 26 and of the intermediate sealing elements 27, 28 located between the uppermost sealing element 26 and the lowermost sealing element 29 are in sliding contact with a sliding contact surface provided on the outer cylindrical surface 22b of the annular sealing contact member 22.

For example, the uppermost sealing element 26 and the first intermediate sealing element 27 allow to prevent intrusion of outer particles, dust and liquids. The lowermost sealing element 29 allows to prevent grease leakage and the second intermediate sealing element 28 forms a back-up seal in case of damage of one the other sealing elements 26, 27, 29.

The sealing lips 26b, 27b, 28b, 29b provide a dynamic sealing function with the inner ring 14. The frictional contact between the lips and the sealing contact surfaces is radial.

The free ends of the sealing lips are each advantageously of triangular shape in cross-section in order to limit the friction between the sealing elements, the inner ring 14 and the sealing contact member 22.

As illustrated, the slewing bearing 10 further comprises a first and second guiding rings 30, 32 arranged in the circumferential groove 20b of the outer cap 20. Alternatively, the slewing bearing 10 may comprise a single guiding ring between two adjacent sealing elements.

The guiding rings 30, 32 are annular. The first guiding ring 30 is axially mounted between the annular heels 26a, 27a of the uppermost and first intermediate sealing elements 26, 27. The second guiding ring 32 is axially mounted between the annular heels 27a, 28a of the first and second intermediate sealing elements 27, 28. As illustrated, the two guiding rings 30, 32 are similar.

The first guiding ring 30 comprises a flange 30a projecting radially towards the inner ring 14, for example inclined in the same direction as the sealing lip 26b of the uppermost sealing element 26 in order to prevent any reversion of the sealing lip 26b. The first guiding ring 30 further comprises an annular axial collar 30b radially blocking the annular heel 27a of the first intermediate sealing element 27 in a radial inwards direction.

The second guiding ring 32 comprises a flange 32a projecting radially towards the inner ring 14, for example inclined in the same direction as the sealing lip 27b of the first intermediate sealing element 27 in order to prevent any reversion of the sealing lip 27b. The second guiding ring 32 further comprises an annular axial collar 32b radially blocking the annular heel 28a of the second intermediate sealing element 28 in a radial inwards direction. The heels 28a, 29a of the second intermediate and the lowermost sealing elements 28, 29 are axially maintained between the shoulder 12h of the outer ring 12 and the second guiding ring 32.

The slewing bearing 10 further comprises an adjusting shim 40 comprising an annular ring 42 and an annular axial collar 44 axially extending from the annular ring 42.

Figure 2:
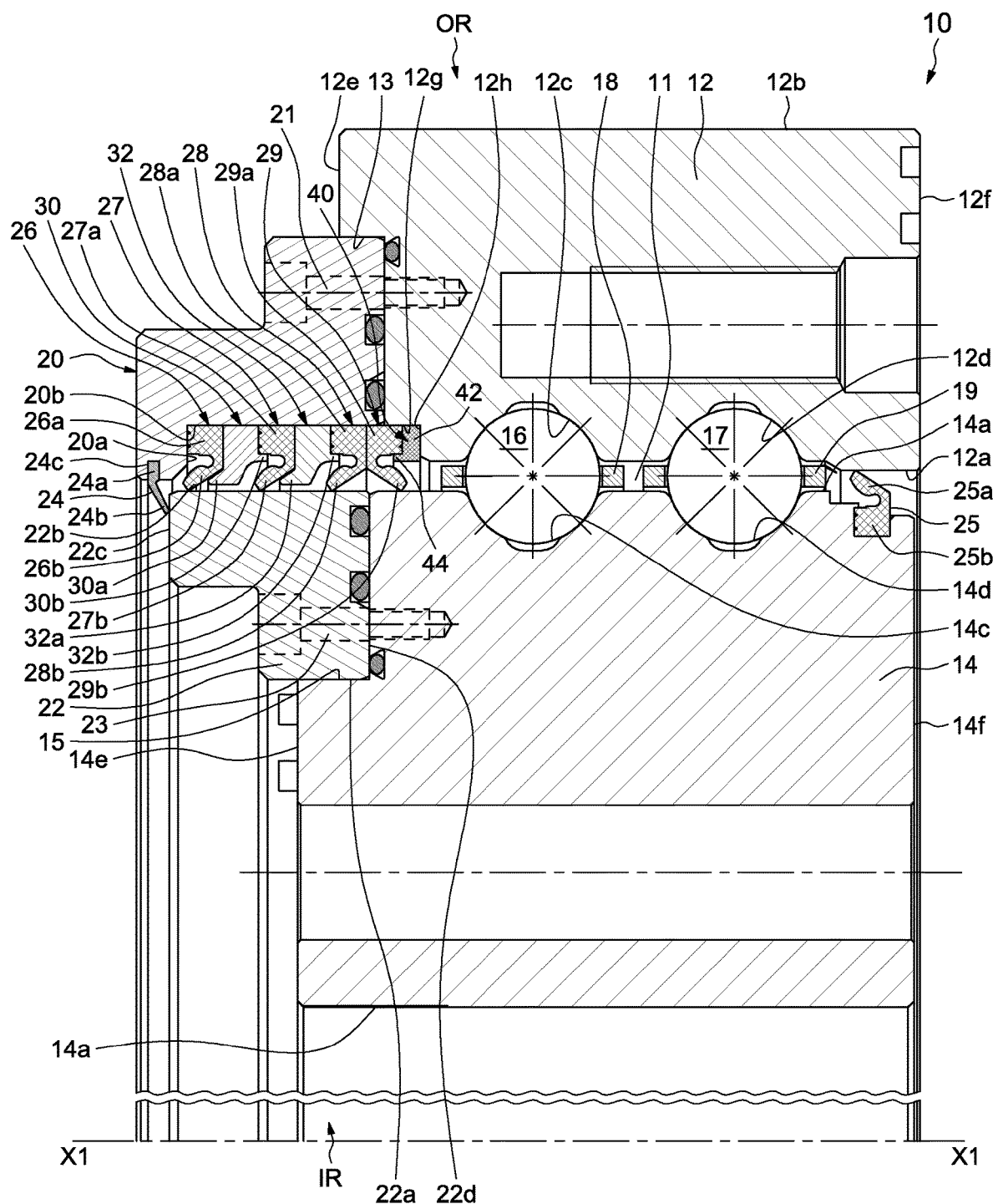
FIG. 2 is the bearing of FIG. 1 with the adjustable shim in a second position.

The adjusting shim 40 is configured to adopt two axial positions inside the slewing bearing 10:

A first axial position, shown in FIG. 1, wherein the annular ring 42 is mounted in the circumferential groove 20b of the outer cap 20 and is axially located between the shoulder 20a of an outer cap 20 and the annular heel 26a of the uppermost sealing element 26; and A second axial position, shown in FIG. 2, wherein the annular ring 42 is mounted in the circumferential groove 12g of the outer ring 12 and is axially located between the shoulder 12h of the outer ring 12 and the annular heel 29a of the lowermost sealing element 29.

In the first axial position, the annular axial collar 44 of the adjusting shim 40 blocks radially the annular heel 26a of the uppermost sealing element 26 and in the second axial position, the annular axial collar 44 blocks radially the annular heel 29a of the lowermost sealing element 29.

As an alternative, the adjusting shim 40 could be configured to adopt three or more axial positions inside the slewing bearing 10, such as for example an intermediate position wherein the adjusting shim 40 is located between a sealing element and an adjacent guiding ring.

By displacing the adjusting shim 40 from the first to the second axial position, the outer cap 20 is disconnected from the outer ring 12 and the sealing elements 26, 27, 28, 29 are axially displaced along the sealing running surface provided on the outer cylindrical surfaces 14b, 22b respectively of the inner ring 14 and the sealing contact member 22, thereby increasing the lifetime of the sealing running surface.

As an alternative, the number of adjusting shim may be different. For example, the slewing bearing 10 may comprise two or more adjusting shims having at least two different axial positions.

The adjusting shim 40 is axially clamped with the sealing elements 26, 27, 28, 29 by the guiding rings 30, 32.

When positioning the adjusting shim 40 in the second position, the shim 40 is reversed in order that the annular axial collard 44 clamps radially the associated sealing elements and maintains the static sealing function.

Figure 3:
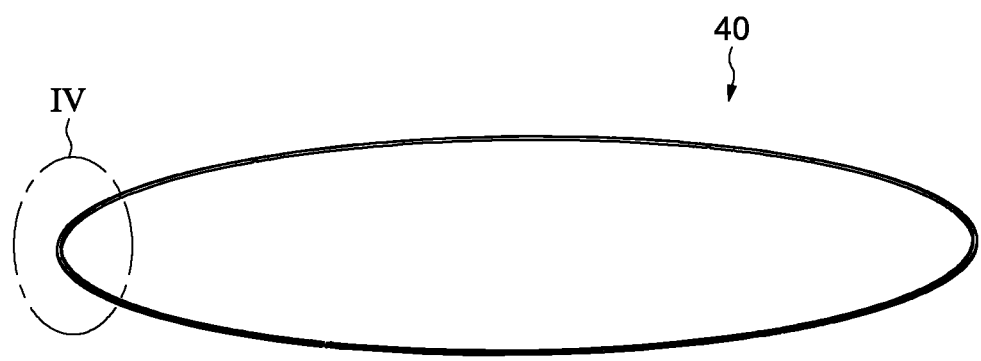
FIG. 3 is a perspective view of the adjustable shim according to an embodiment of the invention.
Figure 4:
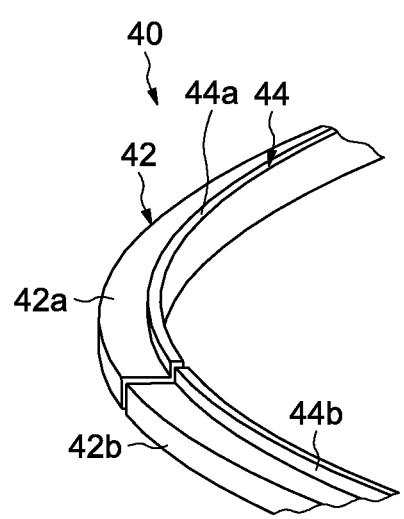
FIG. 4 is detailed view of the adjustable shim of FIG. 3.

As can be seen on FIGS. 3 and 4, the adjusting shim may be one single annular ring of 360° or may comprise a plurality of ring segments each having an annular ring part 42a, 42b and an axial collard 44a, 44b. As illustrated, the adjusting shim 40 is segmented in six segments. Alternatively, the adjusting shim 40 may be segmented in two or more segments.

The adjusting shim 40 is preferably made in sea water resistant material, such as, for example polymeric material, such as polyether ether ketone (PEEK) or any thermoplastic polymer as long as it is seawater resistant and compatible with lubricant used in bearings.

The sealing assembly formed by the cap 20, the sealing elements 26, 27, 28, 29, the guiding rings 30, 32 and the adjusting shim 40 are maintained axially and radially with respect to the inner ring 14. Moreover, these elements are easy to be axially mounted during assembly of the slewing bearing 10. These elements are also easy to be removed and replaced by new elements during a maintenance operation of the slewing bearing.

Figure 5:
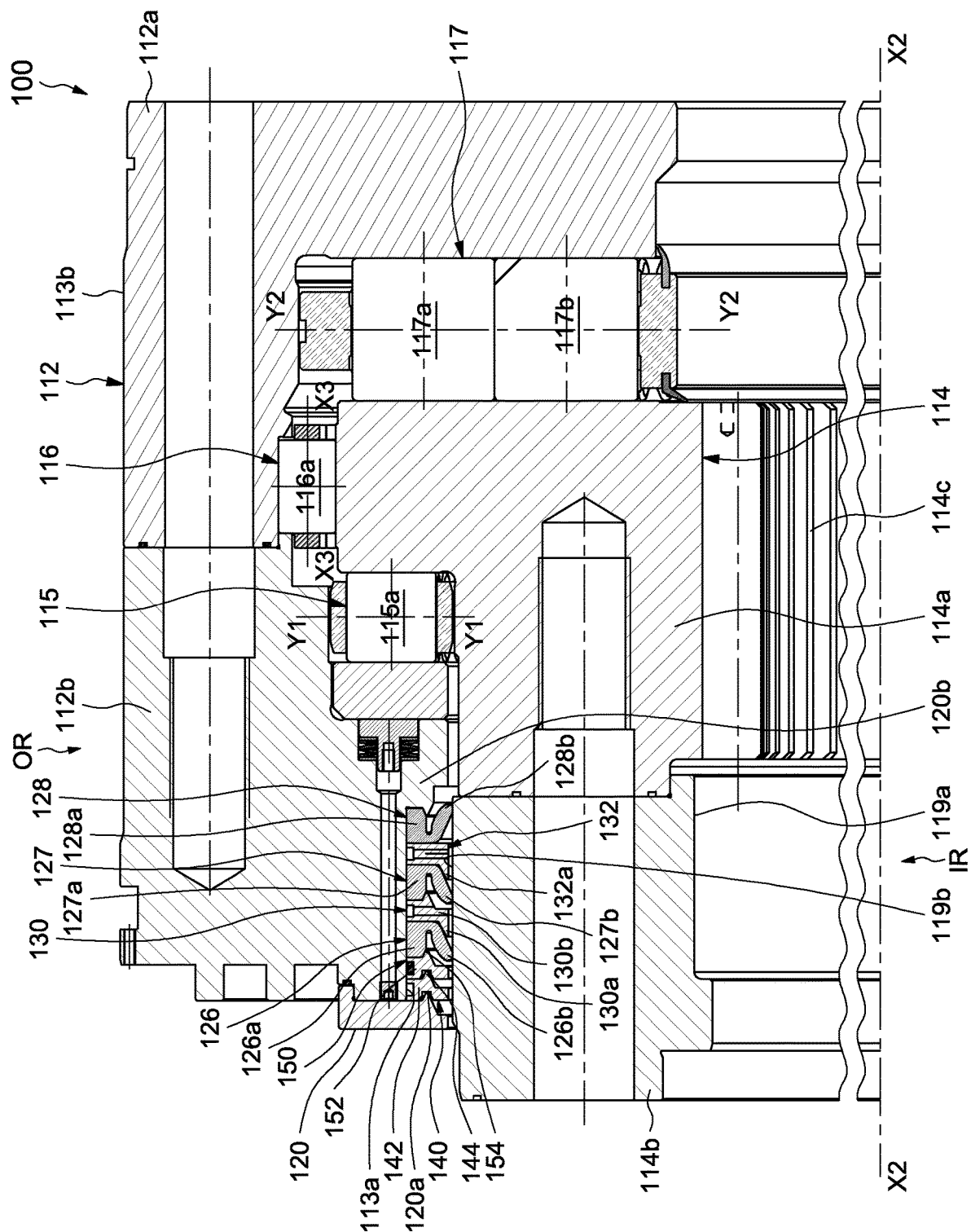
FIG. 5 is a partial view in axial section of a bearing according to a second embodiment of the invention, having two adjustable shims in a first position.
Figure 6:
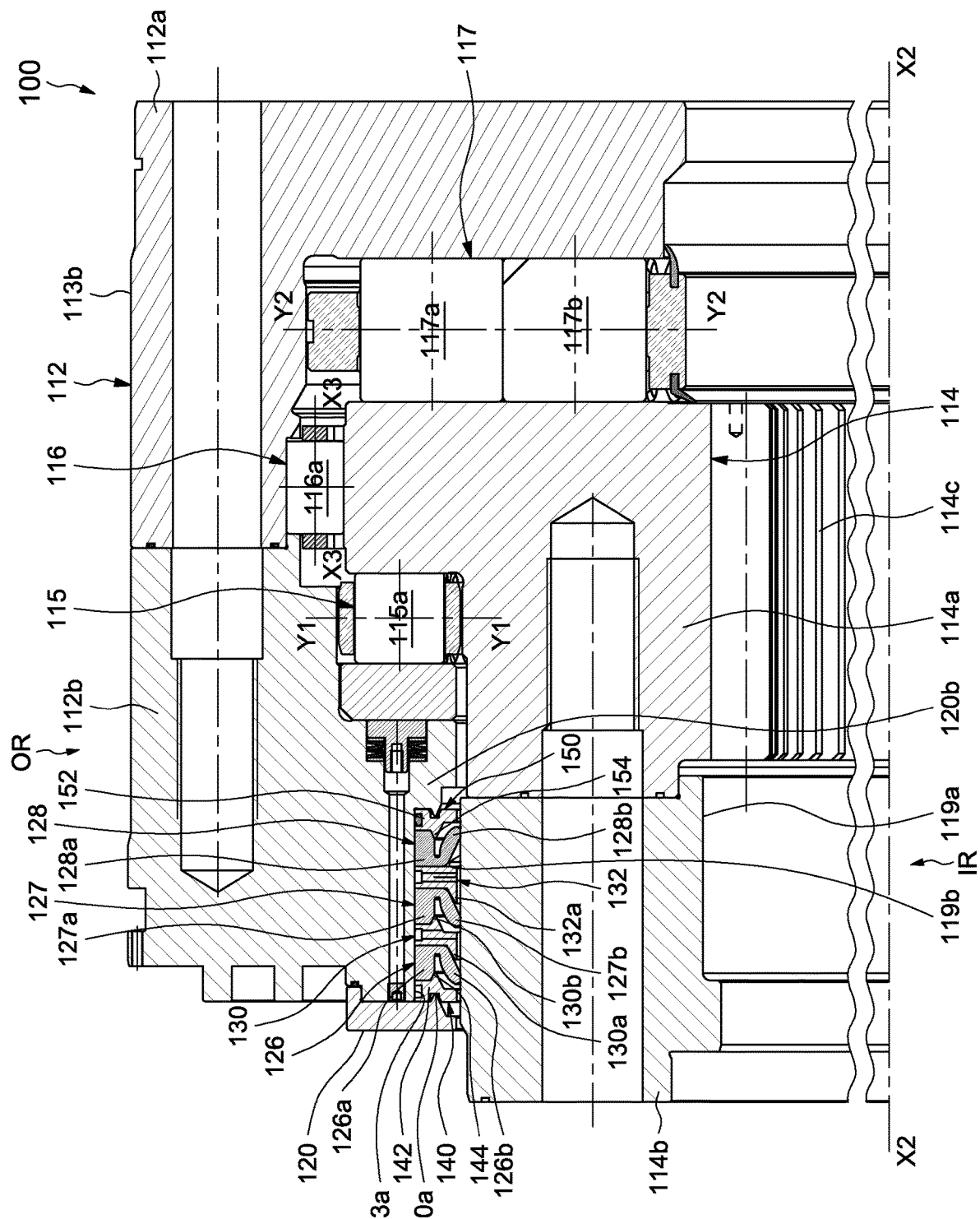
FIG. 6 is the bearing of FIG. 5 with the adjustable shims in a second position.
Figure 7:
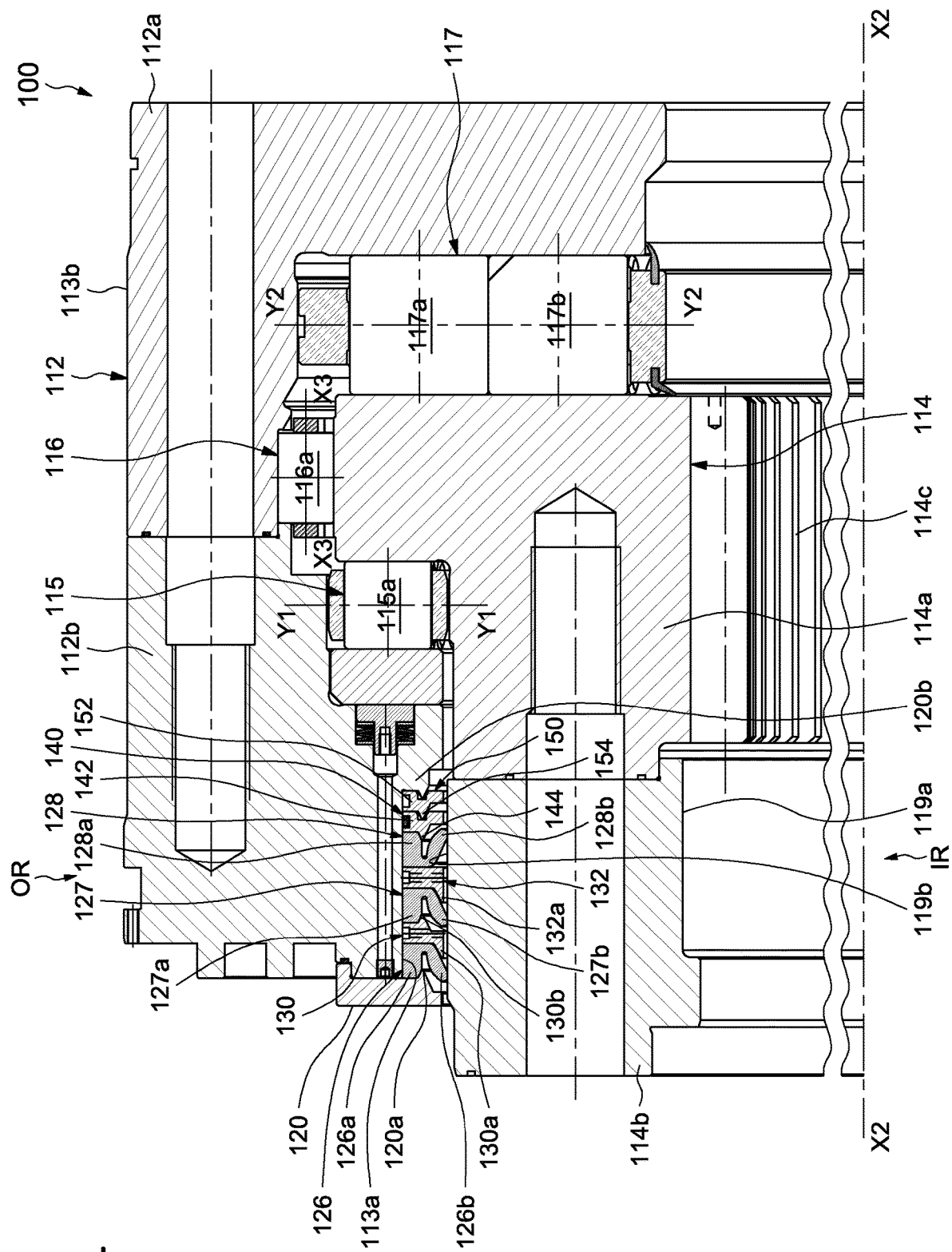
FIG. 7 is the bearing of FIG. 5 with the adjustable shims in a third position.

Referring now to FIGS. 5 to 7, which illustrate another embodiment of a roller bearing 100, for example a large diameter intended to be used in particular in a tunnel boring machine or in mooring buoys.

The roller bearing 100 comprises an outer ring 112 as a first ring, a rotating inner ring 114 as a second ring between which are arranged three sets of rolling elements 115, 116, 117, such as rollers 115a, 116a, 116a, 117a, 117b. alternatively, the roller bearing 100 may comprise another number of sets of rolling elements or another configuration of those rolling elements.

The rollers 115a, 117a, 117b of the first and third sets 115, 117 are radial rollers having a rotation axis Y1-Y1; Y2-Y2 perpendicular to the rotation axis X2-X2 of the roller bearing 100.

The rollers 116a of the second set 116 are axial rollers having a rotation axis X3-X3 parallel to the rotation axis X2-X2 of the roller bearing 100.

The third set 117 comprises two superposed rows of rollers 117a, 117b along the axis of rotation Y2-Y2 of the rollers, making them coaxial. Alternatively, the third set could have a single row of rollers.

The inner and outer rings 114, 112 are concentric and extend axially along the axis of rotation X2-X2 of the roller bearing 100.

The set of rollers will not be further described, as the invention is not limited to this configuration. The rollers may also have inclined axis of rotation.

As illustrated, the outer ring 112 comprises two outer ring parts 112a, 112b assembled together with bolts (not shown). Alternatively, the outer ring 112 could be a single part ring. The inner ring 114 comprises two inner ring parts 114a, 114b assembled together by bolts (not shown). Alternatively, the inner ring 114 could be a single part ring.

The outer ring 112 and the inner ring 114 are in the form of concentric rings rotatable around the rotation axis X2-X2 of the bearing 100, the outer ring 112 surrounding radially the inner ring 114.

As illustrated, the outer ring 112 is of solid type and is radially delimited by an inner cylindrical surface or bore 113a and an outer cylindrical surface 113b.

The roller bearing 100 further comprises an outer cover 120 reversibly fixed to the outer ring 112, notably to the second part 112b, by fixing means, such as screws (not shown) screwed in threaded holes (not referenced) provided in the outer cover 120 and the outer ring 112. The outer cover 120 is annular. Alternatively, the outer cap may comprise a plurality of circumferentially adjacent outer cap parts.

As illustrated, the inner ring 114 is of radially delimited by an inner cylindrical surface or bore 119a and an outer cylindrical surface 119b.

The second part 114b of the inner ring 114 forms an annular sealing contact member fixed to the first part 114a by fixing means, such as screws (not shown) screwed in threaded holes (not referenced) provided in the sealing contact member 114b and the first part 114a of the inner ring 114. The first part 114a of the inner ring 114 comprises, on its bore, a plurality of gearing teeth 114c.

As illustrated, the annular sealing contact member 114b is annular. Alternatively, the annular sealing contact member 114b may comprise a plurality of circumferentially adjacent annular sealing contact member parts.

The roller bearing 100 further comprises upper sealing elements 126, 127, 128 mounted in the bore 113b of the second part 112b of the outer ring 112. The uppermost and the intermediate sealing elements 126, 127 allow to prevent intrusion of outer particles, dust and liquids and small rocks. The lowermost sealing element 129 allows to prevent grease leakage.

Alternatively, the roller bearing 100 may comprise one, two or more than two upper sealing elements. The upper sealing elements 126, 127, 128 may be made of elastomeric material, for example nitrile rubber.

The upper sealing elements 126, 127, 128 each comprise an annular heel 126a, 127a, 128a mounted in the bore 113b of the second part 112b of the outer ring 112.

The upper sealing elements 126, 127, 128 further each comprise a sealing lip 126b, 127b, 128b projecting radially inwardly towards the inner ring 114, notably the annular sealing contact member 114b. The sealing lips 126b, 127b, 128b are flexible in the radial direction. As illustrated, the sealing lips 126b, 127b, 128b extend obliquely with respect to a radial plane. As illustrated, the lowermost seal 128 is provided with a sealing lip 128b that is oriented opposite to the orientation of the sealing lip 126b of the upper most sealing element 126.

The sealing lips 126b, 127b, 128b of the sealing elements 126, 127, 128 are in sliding contact with a sliding contact surface provided on the outer cylindrical surface 119b of annular sealing contact member 114b.

The sealing lips 126b, 127b, 128b provide a dynamic sealing function with the inner ring 114. The frictional contact between the lips and the sealing contact surfaces is radial.

The free ends of the sealing lips are each advantageously of triangular shape in cross-section in order to limit the friction between the sealing elements, and the sealing contact member 114b As illustrated, the roller bearing 100 further comprises a first and second guiding rings 130, 132 arranged in the circumferential groove 113b of the second part 112b of the outer ring 112. The second part 112b and the outer cover 120 act as an outer cap.

Alternatively, the roller bearing 100 may comprise a single guiding ring between two adjacent sealing elements.

The guiding rings 130, 132 are annular. The first guiding ring 130 is axially mounted between the annular heels 126a, 127a of the uppermost and the intermediate sealing elements 126, 127. The second guiding ring 132 is axially mounted between the annular heels 127a, 128a of the intermediate and the lowermost sealing elements 127, 128. As illustrated, the two guiding rings 130, 132 are different.

The first guiding ring 130 comprises a flange 130a projecting radially towards the second part 114b of the inner ring 114, for example inclined in the same direction as the sealing lip 126b of the uppermost sealing element 126 in order to prevent any reversion of the sealing lip 126b. The first guiding ring 130 further comprises an annular axial collar 130b radially blocking the annular heel 127a of the intermediate sealing element 127 in a radial inwards direction.

The second guiding ring 132 comprises a flange 132a projecting radially towards the second part 114b of the inner ring 114, for example inclined in the same direction as the sealing lip 127b of the intermediate sealing element 127 in order to prevent any reversion of the sealing lip 127b. As illustrated, the second guiding ring 132 does not comprise an annular axial collar radially blocking the annular heel of the lowermost sealing element 128. Alternatively, the second guiding ring 132 could have a flange projecting towards the second part 114b inclined in the same direction as the sealing lip 128b of the lowermost sealing element 128.

The roller bearing 100 further comprises two adjusting shims 140, 150 each comprising an annular ring 142, 152 and an annular axial collar 144, 154 axially extending from the corresponding annular ring 142, 152.

Each adjusting shim 140, 150 is mounted in the bore 113b of the second ring part 112b and is configured to adopt three axial positions inside the slewing bearing 100:

A first axial position, shown in FIG. 5, wherein the two adjusting shim 140, 150 are adjacent and axially mounted between an annular axial collar 120a of the cover 120 axially extending towards the sealing elements 126, 127, 128 and the uppermost sealing element 126, notably the annular heel 126a;

A second axial position, shown in FIG. 6, wherein the first adjusting shim 140 is axially mounted between the annular axial collar 120a of the cover 120 and the uppermost sealing element 126, and the second adjusting shim 150 is axially mounted between the lowermost sealing element 128, notably the annular heel 128a, and a shoulder 120b of the second ring part 112b; and A third axial position, shown in FIG. 7, wherein the two adjusting shim 140, 150 are adjacent and axially mounted between the lowermost sealing element 28, notably the annular heel 128a, and the shoulder 120b of the second ring part 112b.

In the first axial position, the annular axial collar 154 of the second adjusting shim 150 blocks radially the annular heel 126a of the uppermost sealing element 126, while the annular axial collar 144 of the first adjusting shim 140 blocks radially the annular ring 152 of the second adjusting shim 150.

In the second axial position, the annular axial collar 144 of the first adjusting shim 140 blocks radially the annular heel 128a of the lowermost sealing element 128, while the annular axial collar 154 of the second adjusting shim 150 blocks radially the annular heel 28a of the lowermost sealing element 28.

In the third axial position, the annular axial collar 144 of the first adjusting shim 140 blocks radially the annular ring heel 128a of the lowermost sealing element 128, while the annular axial collar 154 of the second adjusting shim 150 blocks radially the annular ring 142 of the first adjusting shim 140.

By displacing the adjusting shims 140, 150 from the first to the second axial position, the outer cover 120 is disconnected from the outer ring 112 and the sealing elements 126, 127, 128 are axially displaced along the sealing running surface provided on the outer cylindrical surfaces 119b of the sealing contact member 114b, thereby increasing the lifetime of the sealing running surface.

The adjusting shims 140, 150 are clamped with the sealing elements 126, 127, 128 by the guiding rings 130, 132.

When positioning the adjusting shims 140, 150 in the second position, the second adjusting shim 150 is reversed in order that the annular axial collar 154 clamps radially the associated sealing elements and maintains the static sealing function.

When positioning the adjusting shims 140, 150 in the third position, the first adjusting shim 140 is reversed in order that the annular axial collar 144 clamps radially the associated sealing elements and maintains the static sealing function.

Each adjusting shim 140, 150 may be one single annular ring of 360° or may comprise a plurality of ring segments each having an annular ring part and an axial collar. For example, each adjusting shim 140, 150 may be segmented in six segments. Alternatively, each adjusting shim 140, 150 may be segmented in two or more segments. For example, one adjusting shim may be an annular ring and the other adjusting shim may be segmented. As an alternative, the number of segments of each adjusting shim may be different.

As an alternative, the number of adjusting shim may be different. For example, the roller bearing 100 may comprise one adjusting shim having at least two different axial positions, or a number of adjusting shims higher than three.

Each adjusting shim 140, 150 is preferably made in sea water resistant material, such as, for example polymeric material, such as polyether ether ketone (PEEK) or any thermoplastic polymer.

In an alternative, the adjusting shim 140, 150 could be made in steel, such as for example S355.

The assembly comprising the outer ring parts 112a, 112b and the cover 120 may be referred to an outer ring assembly OR.

The assembly comprising the inner ring parts 114a, 114b may be referred to an inner ring assembly IR.

The annular axial collar 120a of the cover 120 is referred to as first shoulder of the outer ring assembly, and the shoulder 120b of the second outer ring part 112b is referred to as second shoulder of the outer ring assembly, axially opposite to the first shoulder compared to the sealing elements.

The sealing assembly formed by the second ring part 112b, the cover 120, the sealing elements 126, 127, 128, the guiding rings 130, 132 and the adjusting shims 140, 150 are maintained axially and radially with respect to the inner ring 114. Moreover, these elements are easy to be axially mounted during assembly of the roller bearing 100. These elements are also easy to be removed and replaced by new elements during a maintenance operation of the roller bearing.

The invention applies to a rolling bearing but also be applied to a plain bearing.

The invention provides a bearing configured to ensure relative rotation between a first ring and a second ring with improved sealing properties and with improved service life of the sealing running surface.

Thanks to the adjusting shim, the service life of the sealing running surface of the rolling bearing is significantly increased.

Furthermore, maintenance costs are significantly reduced, since there is not needed to change the whole ring having the sealing running surface.

The invention claimed is:

1. A bearing comprising:
   a first ring assembly, and
   a second ring assembly, the first ring assembly comprising at least a first ring and an outer cap reversibly fixed to the first ring, and
   at least one sealing element comprising a base, the base mounted radially into contact with a cylindrical surface of the first ring assembly and provided with a sealing lip in sliding frictional contact with the second ring assembly,
   at least one adjusting shim mounted radially between the first and second ring assemblies, the at least one adjusting shim comprising a first adjusting shim, the first adjusting shim having a radial facing side and an axial facing side, the first adjusting shim being positioned with the radial facing side contacting the cylindrical surface of the outer cap and the axial facing side contacting an axially inner surface of the outer cap,
   wherein, when viewed in cross-section, the first adjusting shim comprises an axially extending collar opposite the axial facing side, the axially extending collar defining a radially outer surface which retains the base of the sealing element in position against the outer cap.

2. The bearing according to claim 1, wherein the adjusting shim is circumferentially segmented in at least two segments.

3. The bearing according to claim 1, wherein the adjusting shim is made of plastic material.

4. The bearing according to claim 1, wherein the at least one sealing element comprises a first sealing element and a second sealing element, the bearing further comprising at least one guiding ring axially arranged between the first and second sealing elements and comprising a flange radially projecting towards the second ring assembly inclined in the same direction as the sealing lip of one of the first or second sealing elements.

5. The bearing according to claim 4, wherein the guiding ring comprises an annular axial collar configured to radially block the other of the first or second sealing elements.

6. The bearing according to claim 1, wherein the sealing element is mounted at least in the cylindrical surface of the outer cap or in the cylindrical surface of the first ring.

7. The bearing according to claim 1, further comprising at least one row of rolling elements arranged between the ring assemblies.

8. A bearing comprising:
a first ring assembly, and
a second ring assembly, the first ring assembly comprising at least a first ring and an outer cap reversibly fixed to the first ring, and
at least one sealing element comprising a base, the base mounted radially into contact with a cylindrical surface of the first ring assembly and provided with a sealing lip in sliding frictional contact with the second ring assembly,
at least one adjusting shim mounted radially between the first and second ring assemblies, the at least one adjusting shim comprising a first adjusting shim, the first adjusting shim having a radial facing side and an axial facing side, the first adjusting shim being positioned with the radial facing side contacting the cylindrical surface of the first ring and the axially facing side contacting an axially outer surface of the first ring,
wherein, when viewed in cross-section, the first adjusting shim comprises an axially extending collar opposite the axial facing side, the axially extending collar defining a radially outer surface which retains the base of the sealing element in position against the first ring.

9. The bearing according to claim 8, wherein the adjusting shim is circumferentially segmented in at least two segments.

10. The bearing according to claim 8, wherein the adjusting shim is made of plastic material.

11. The bearing according to claim 8, wherein the at least one sealing element comprises a first sealing element and a second sealing element, the bearing further comprising at least one guiding ring axially arranged between the first and second sealing elements and comprising a flange radially projecting towards the second ring assembly inclined in the same direction as the sealing lip of one of the first or second sealing elements.

12. The bearing according to claim 11, wherein the guiding ring comprises an annular axial collar configured to radially block the other of the first or second sealing elements.

13. The bearing according to claim 11, wherein the at least one adjusting shim comprises a second adjusting shim, the first and second adjusting shims being mounted radially between the first and second ring assemblies, wherein:
the first adjusting shim being axially located between the first ring of the first ring assembly and an axially innermost sealing element and the second adjusting shim being axially located between the outer cap of the first ring assembly and the axially outermost sealing element; or
the first adjusting shim being axially located between the first ring of the first ring assembly and the second adjusting shim and the second adjusting shim being axially located between the axially innermost sealing element and first adjusting shim.

14. The bearing according to claim 8, wherein the sealing element is mounted at least in the cylindrical surface of the outer cap or in the cylindrical surface of the first ring.

15. The bearing according to claim 8, further comprising at least one row of rolling elements arranged between the ring assemblies.

* * * * *